Nov. 29, 1927.      B. F. HOPKINS      1,650,941
SPRING MANUFACTURE
Filed Feb. 3, 1923      2 Sheets-Sheet 2
 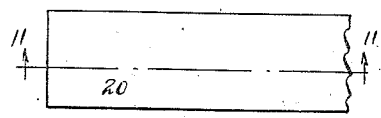 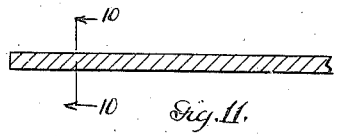
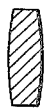 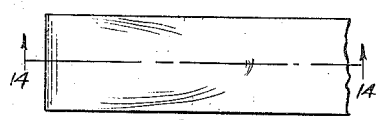 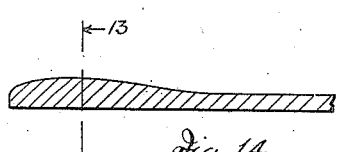
 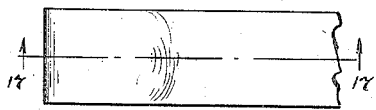 
 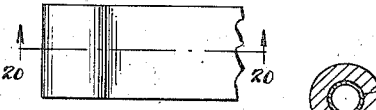 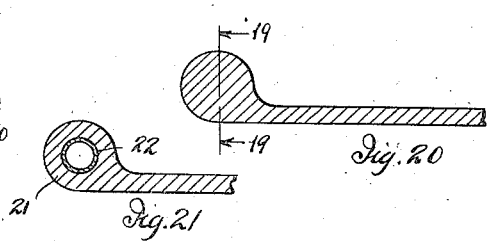
 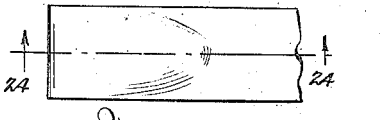 
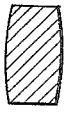 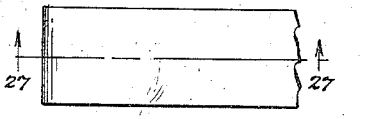 
 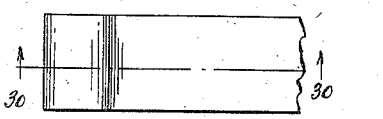 
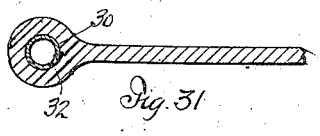
INVENTOR.
Benjamin F. Hopkins
BY
Fay, Oberlin & Fay
ATTORNEYS Patented Nov. 29, 1927.

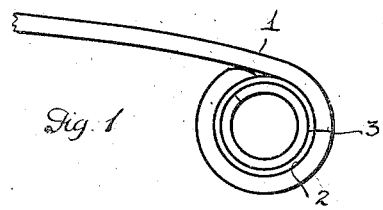
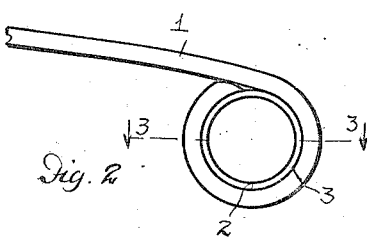
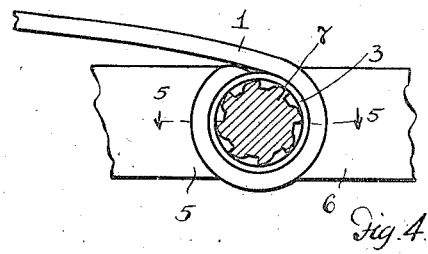
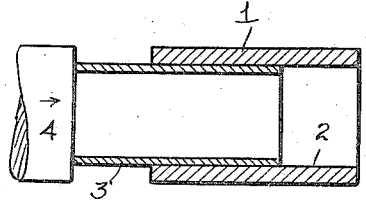
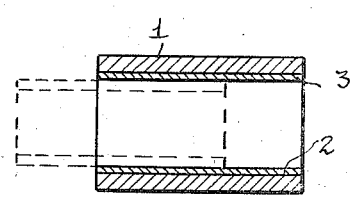
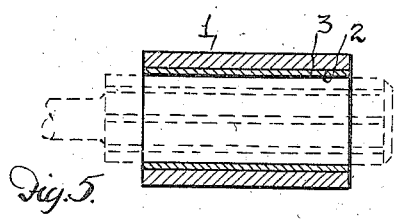
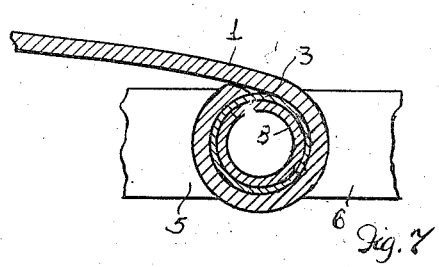
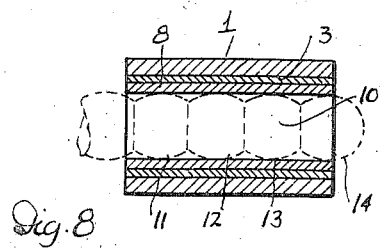

1,650,941

UNITED STATES PATENT OFFICE.

BENJAMIN F. HOPKINS, OF CLEVELAND HEIGHTS, OHIO, ASSIGNOR TO THE CLEVELAND GRAPHITE BRONZE COMPANY, OF CLEVELAND, OHIO, A CORPORATION OF OHIO.

SPRING MANUFACTURE.

Application filed February 3, 1923. Serial No. 616,840.

The present invention, relating, as indicated, to spring manufacture, is more particularly directed to an improved spring for use in motor vehicles and the like and one having improved spring eyes and bushings therein. One of the principal objects of my invention is to provide a solid non-opening reinforcement for a spring eye bushing, either by the use of an integral one-piece leaf or by the provision of a solid, rigid closed shell mounted in the eye as a support for the bushing. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawings:—

Fig. 1 is a side elevation of an end of a leaf spring provided with a solid reinforcing shell in the eye; Fig. 2 is a similar view showing the eye with the shell in place, but without the bushing; Fig. 3 is a central longitudinal section showing the mounting of the shell; Fig. 4 is a view of the spring eye with the shell in place, undergoing a reaming operation; Fig. 5 is a section on the line 5—5, in Fig. 4; Fig. 6 is a view similar to Fig. 3, but showing the introduction of the bushing into the shell; Fig. 7 is a view similar to Fig. 1, but showing the spring eye held in clamps while the bushing is being fitted into place and burnished; Fig. 8 is a longitudinal central section of the bushing and spring eye shown in Fig. 7 undergoing the operation of burnishing; Fig. 9 is a plan view of the end portion of a spring leaf; Fig. 10 is a transverse section thereof on the line 10—10 in Fig. 11; Fig. 11 is a longitudinal section thereof on the line 11—11 in Fig. 9; Fig. 12 is a similar plan view of such spring leaf end after an initial upsetting operation; Figs. 13 and 14 are transverse and longitudinal sections thereof on the lines 13—13, Fig. 14, and 14—14 Fig. 12, respectively; Fig. 15 is a plan view of the spring leaf after a further upsetting operation; Figs. 16 and 17 are transverse and longitudinal sections thereof on the lines 16—16 Fig. 17 and 17—17 Fig. 15, respectively; Fig. 18 is a similar view after a final upsetting operation; Figs. 19 and 20 are transverse and longitudinal sections thereof on the lines 19—19 Fig. 20 and 20—20 Fig. 18, respectively; Fig. 21 is a longitudinal section of the upset spring leaf end of Figs. 18 to 20, showing the same after having been pierced to produce a spring eye therein; Fig. 22 is a plan view of a spring leaf end after an initial upsetting operation corresponding to the operation shown in Fig. 12, but performed to produce a symmetrical upset portion; Figs. 23 and 24 are transverse and longitudinal sections thereof on the lines 23—23, Fig. 24, and 24—24, Fig. 22, respectively; Fig. 25 is a similar plan view after a second upsetting operation; Figs. 26 and 27 are transverse and longitudinal sections thereof on the lines 26—26 Fig. 27 and 27—27 Fig. 25, respectively; Fig. 28 is a plan view after a further and final upsetting operation; Figs. 29 and 30 are transverse and longitudinal sections thereof on the lines 29—29 Fig. 30 and 30—30 Fig. 28; and Fig. 31 is a longitudinal section through the spring end of Figs. 28 to 30, showing the same after piercing to produce a spring eye therein.

The spring eyes of motor vehicles, such as an automobile, have long been a source of trouble, and are today the point of quickest wear in the ordinary medium-priced automobile. The ordinary practice involves the rolling up of the end of the main spring leaf of vehicle spring to form an eye, which is then provided with a bushing, through which the bolt connecting the spring leaf to the frame or to shackle member is passed. The spring eye as thus formed is expansible and opens up under even slight blows, as well as under the strain which is put upon it in use. In addition to this fault it is extremely difficult to hold the diameter of the hole through the spring eye to close limits, and therefore the bushings which are used, many times do not closely fit the spring eye in the first place, and if they are a proper fit usually the operation of pressing the bushing into place expands the spring eye and produces a very loose and uneven fit between bushings and the eye with the result already noted, i. e., that the bushing is very liable to drop out, and, in many cases, falls out during the handling of the spring prior to and during its assembly in a car. By reason of this loose and improper fit of the bushing in the spring eye there is a constant pound or radial movement given to the bushing in the eye during use, which still further opens up the eye and causes deformation of the bushing, and either binding on the bolt which passes through the bushing, or such an amount of play that the radial movement of the bolt accentuates the looseness of the fit and causes a constant and annoying pounding on the bushing.

The above difficulties are greatly increased when split or expansible bushings, such as are now so commonly used at various points in motor vehicles, are employed in spring eyes. In this case not only is the spring eye expansible, but so also is the bushing, and the result is that in a very short time the bushing is such a loose fit for the bolt that wear and pounding occur with resultant damage to the bushing and with the production of extremely disagreeable noise to the user of the vehicle. In the ordinary medium priced automobile the effective life of the bushing in the spring eyes is not more than two or three thousand miles at the most, and in many cases even less.

The present invention consists in the provision of an improved type of spring eye construction, in which a firm nonexpansible support or reinforcement is given to the bushing and an accurate and close fit maintained between the bushing and the surrounding metal. Tests of the several types of improved spring eye constructions here illustrated and described show a life of from 10,000 to 100,000 miles without any undue wear on either the bushing or the bolt.

In Figs. 1 to 8 I have illustrated one form of such construction in which the ordinary main spring leaf 1 is provided with the eye 2, into which is press-fitted a reinforcing metal shell 3, which is pressed in by means of the plunger 4, (see Fig. 3). During the mounting of the shell 3 the spring eye should be held against opening by means of clamps or dies 5 and 6, (see Fig. 6), although in some cases this is not necessary. The shell 3 can either be finished to the desired inside diameter before mounting or it can be brought to the desired size by reaming it with a tool 7, shown in Fig. 4, as may be desired, and in either case is brought to approximately the desired finished size, which can be held to very close limits.

After this reinforcing member has been mounted in place a split bushing 8 is lightly press-fitted into place in the shell 3, as shown in Figs. 6 and 7, and again the entire spring may, if desired, be mounted and held in the dies 5 and 6. After being mountetd in place this bushing is burnished into place, or is mounted and burnished at the same time by means of a burnishing tool 10 provided with a series of burnishing buttons 11, 12, 13 and 14, which serve to bring the bushing to the desired inside size and at the same time to set back or flow the excess metal of the bushing into the irregularities of the hole in the shell 3 by means of the method which is completely set forth in the patent to Johnson and Myers, No. 1,469,793, dated Oct. 7, 1923.

Another construction of spring eye and bushing which accomplishes the same result of providing a fixed non-expansible reinforced body of metal for the bushing, and which, in addition, prevents any possible opening up of the spring eye, as illustrated in Figs. 9 to 31, inclusive. In Fig. 9 I have shown a plan view of the end of a main spring leaf 20 before any operations have been performed on it to produce an eye. This spring leaf end is then upset to the form shown in Fig. 12 to thicken it. A second operation increases the thickness of this end, as illustrated in Figs. 15, 16 and 17, after which the thickened end is pierced, as shown in Fig. 21, to produce a cylindrical opening 21 through the end 22, which constitutes a spring eye. The upsetting and pressing of the end of the spring leaf to produce a spring eye may be accomplished in various numbers of operations, either in three operations, as here described, or otherwise as may be found necessary, and by suitable dies and machines which need not be described in detail.

The spring eye 21 of Fig. 21 is formed on one side of the spring leaf and corresponds in this particular to the spring eye of Fig. 1, but of course the eye may equally well be formed symmetrically with respect to the central plane of the leaf, as is fully illustrated in Figs. 22 to 31.

Fig. 22 is a plan view of a spring leaf upset symmetrically (see Figs. 23 and 24); while Figs. 25 and 28 show the succeeding upsetting operations required to produce the symmetrical eye 30 shown in Fig. 31, in which the hole 32 is aligned with the central plane of the leaf.

This method of forming a spring eye may be carried out in a forging machine, or with similar apparatus, and by means of dies which can be readily designed by those skilled in this art. After the eye has been formed, a bushing, either of the split or continuous type, may be fitted into place in the eye, and should preferably be burnished into place in the manner already described in order to flow the metal of the bearing into the irregularities in the wall of the eye, although this burnishing operation is not necessary to secure the very much increased life which has been referred to, over the bushings now in common use, since it has been found that even a bushing which has not been burnished in place, but has been mounted in the spring eye of the types here described, has a life of at least 10,000 miles in service without undue wear.

The advantages of the present construction and method are that it is relatively inexpensive, being but slightly more expensive than the present constructions in common use, and affords a very much increased life to the bushings and to the bolts passing therethrough. In addition to this, if the bushings are press-fitted into place, even when unburnished, they do not drop out during the preliminary handling of the springs, nor do they work loose or move longitudinally in service, both of which are common faults with the bushings now in general use.

Other forms may be employed embodying the features of my invention instead of the one here explained, change being made in the form or construction, provided the elements stated by the following claim or the equivalent of such stated elements be employed, whether produced by my preferred method or by others embodying steps equivalent to those stated in the following claim.

I therefore particularly point out and distinctly claim as my invention:—

In a method of making a spring leaf, the steps which consist in successively upsetting the end of a spring leaf by a series of operations to at least twice the original thickness thereof while maintaining the width of the leaf undiminished during all of said upsetting operations, and then piercing such upset end portion to produce a transversely extending eye therethrough, such eye being of substantially the same length as the original width of said leaf.

Signed by me, this 27th day of January, 1923.

BENJAMIN F. HOPKINS.